US012794350B2

(12) United States Patent
Asano

(10) Patent No.: US 12,794,350 B2
(45) Date of Patent: Nov. 10, 2026

(54) CIRCUIT APPARATUS AND POWER CONVERSION CIRCUIT

(71) Applicant: FUJI ELECTRIC CO., LTD., Kanagawa (JP)

(72) Inventor: Taizo Asano, Matsumoto-city (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 234 days.

(21) Appl. No.: 18/675,151

(22) Filed: May 28, 2024

(65) Prior Publication Data

US 2025/0030332 A1 Jan. 23, 2025

(30) Foreign Application Priority Data

Jul. 19, 2023 (JP) ................................ 2023-117476

(51) Int. Cl.
*H02M 1/00* (2007.01)
*H02M 1/32* (2007.01)
*H02M 3/156* (2006.01)

(52) U.S. Cl.
CPC ............ *H02M 1/32* (2013.01); *H02M 3/156* (2013.01)

(58) Field of Classification Search
CPC .... H02M 1/0009; H02M 1/0003; H02M 1/32; H02M 3/156
See application file for complete search history.

(56) References Cited

U.S. PATENT DOCUMENTS

| | | | | |
|---|---|---|---|---|
| 2006/0193091 A1* | 8/2006 | Joukou | .............. | H03K 17/0828 361/23 |
| 2015/0023076 A1 | 1/2015 | Nakamori | | |
| 2015/0346665 A1* | 12/2015 | Ogawa | .................. | G03G 15/80 399/37 |
| 2019/0253654 A1* | 8/2019 | Kuroda | .................. | H10F 39/12 |
| 2020/0194994 A1 | 6/2020 | Goto | | |
| 2020/0382004 A1* | 12/2020 | Chan | ...................... | H02M 7/04 |

FOREIGN PATENT DOCUMENTS

| | | |
|---|---|---|
| JP | 2011172336 A | 9/2011 |
| JP | 2014093903 A | 5/2014 |
| JP | 2020096436 A | 6/2020 |

* cited by examiner

*Primary Examiner* — Sisay G Tiku

(57) ABSTRACT

Provided is a circuit apparatus including a power conversion circuit and a transmission apparatus, the transmission apparatus transmitting a signal from the power conversion circuit, the power conversion circuit having an alarm signal generation unit which generates an alarm signal indicating whether the power conversion circuit is in a preset state, and a state signal generation unit which generates a state signal having an amplitude different from that of the alarm signal and indicating a state of the power conversion circuit. The power conversion circuit may further have an output terminal which outputs an output signal in which the alarm signal and the state signal are superimposed.

17 Claims, 7 Drawing Sheets

CIRCUIT APPARATUS AND POWER CONVERSION CIRCUIT

The contents of the following patent applications are incorporated herein by reference: NO. 2023-117476 filed in JP on Jul. 19, 2023

BACKGROUND

1. Technical Field

The present invention relates to a circuit apparatus and a power conversion circuit.

2. Related Art

Conventionally, a technique of externally outputting, in a circuit such as a power conversion circuit, an alarm signal indicating abnormality in the circuit or a temperature information signal indicating a temperature of the circuit, has been known (for example, see Patent documents 1 to 3).

Patent document 1: Japanese Patent Application Publication No. 2014-93903

Patent document 2: Japanese Patent Application Publication No. 2011-172336

Patent document 3: Japanese Patent Application Publication No. 2020-96436

DESCRIPTION OF EXEMPLARY EMBODIMENTS

Figure 1:
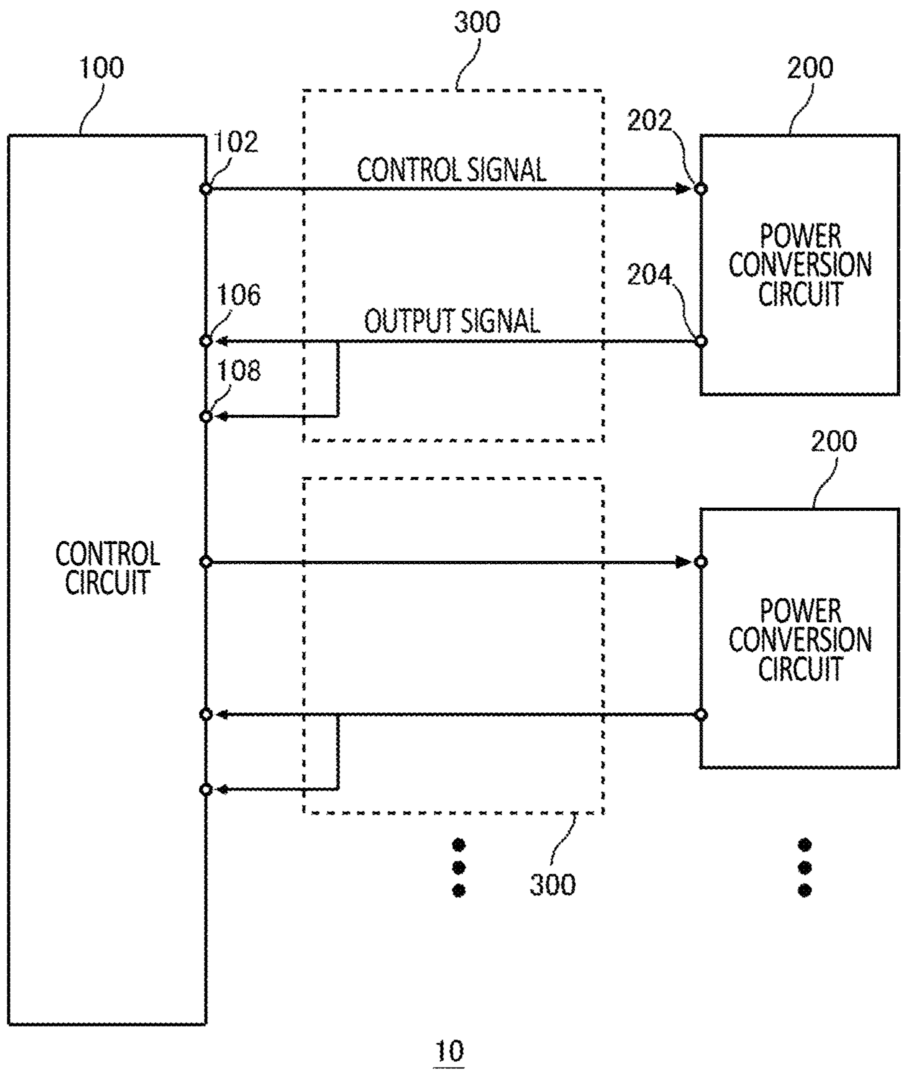
FIG. 1 shows an example of a circuit apparatus 10 according to an embodiment of the present invention.

Hereinafter, embodiments of the present invention will be described. However, the following embodiments are not for limiting the invention according to the claims. In addition, not all combinations of features described in the embodiment are essential to the solution of the invention. Note that, in the present specification and the drawings, elements having substantially the same functions and configurations are denoted by the same reference numerals, and redundant descriptions for them are omitted. Also, elements not directly related to the present invention are omitted from the drawings. Further, in one drawing, elements having the same functions and configurations are denoted by a representative reference numeral, and other reference numerals for the elements may be omitted.

In the present specification, a case where a term such as "same" or "equal" is mentioned may include a case where an error due to a variation in manufacturing or the like is included. The error is, for example, within 10%.

FIG. 1 shows an example of a circuit apparatus 10 according to an embodiment of the present invention. The circuit apparatus 10 includes one or a plurality of power conversion circuits 200 and a transmission apparatus 300. The circuit apparatus 10 may further include a control circuit 100. The transmission apparatus 300 transmits a signal between the power conversion circuit 200 and the control circuit 100. The transmission apparatus 300 may be provided for each power conversion circuit 200. The power conversion circuit 200 may output power to other circuits of a target apparatus in which the circuit apparatus 10 is provided. As an example, the control circuit 100 is a computer provided in the target apparatus. The control circuit 100 may control a circuit other than the power conversion circuit 200 of the target apparatus. As an example, the target apparatus is a car, an industrial robot, or the like, but is not limited to this.

The power conversion circuit 200 converts input power into predetermined output power. As an example, the power conversion circuit 200 is an ACDC converter which converts DC power into AC power, but the embodiment of the power conversion circuit 200 is not limited to this. The power conversion circuit 200 may include a power semiconductor such as an IGBT. The power conversion circuit 200 may include an inverter. The power conversion circuit 200 may supply power to an electric motor such as a motor.

The control circuit 100 controls the power conversion circuit 200. The control circuit 100 may control ON and OFF of an operation of the power conversion circuit 200, and may control an amplitude, a frequency, or the like of power output from the power conversion circuit 200. The control circuit 100 of the present example sends a control signal to each power conversion circuit 200. The control signal may control switching of a transistor inside the power conversion circuit 200.

The power conversion circuit 200 has a control terminal 202 and an output terminal 204. The control signal from the control circuit 100 is input to the control terminal 202 via the transmission apparatus 300. The output terminal 204 outputs an output signal to the control circuit 100. The output signal is transmitted by the transmission apparatus 300.

The output signal includes an alarm signal and a state signal. The alarm signal is a signal indicating whether the power conversion circuit 200 is in a preset state. The state may be an abnormal state such as an overcurrent state where current of a predetermined value or more is flowing in a predetermined portion of the power conversion circuit 200, an overvoltage state where a voltage of a predetermined value or more is applied to a predetermined portion of the power conversion circuit 200, or an overheat state where a temperature of a predetermined portion of the power conversion circuit 200 has a predetermined value or more. The power conversion circuit 200 may change a pulse width of the alarm signal according to the type of the abnormal state. In this manner, the control circuit 100 can detect the type of abnormality occurring in the power conversion circuit 200.

The state signal is a signal indicating a state of the power conversion circuit 200 in a predetermined portion of the power conversion circuit 200. The state of the power conversion circuit 200 may be a state of any one or a plurality of parameters among the temperature, the current, and the voltage in that portion. The state signal may be a signal indicating a numerical value of a state of the temperature, the current, the voltage, or the like. The numerical value of the state of the temperature, the current, the voltage, or the like is indicated by a width of a pulse included in the state signal. In another example, the numerical value of the state of the temperature, the current, the voltage, or the like may be indicated by a density or the like of the pulse. Numerical values of a plurality of parameters may be indicated by using different characteristics of the pulse. For example, among the temperature, the current, and the voltage, a numerical value of any parameter may be indicated by a width of the pulse, and a numerical value of either of the other parameters may be indicated by a density of the pulse. The state signal may be generated according to a request from the control circuit 100, or may be generated according to a predetermined trigger. The output signal of the present example includes the pulse of the alarm signal and the pulse of the state signal. By outputting the alarm signal and the state signal from the output terminal 204 which is in common, the number of terminals of the power conversion circuit 200 can be reduced.

The control circuit 100 of the present example has a control output terminal 102, a state signal input terminal 106, and an alarm input terminal 108. The control output terminal 102 outputs a control signal. The state signal included in the output signal is input to the state signal input terminal 106. The alarm signal included in the output signal is input to the alarm input terminal 108. The transmission apparatus 300 may extract the state signal and the alarm signal from the output signal, and may input those signals to the state signal input terminal 106 and the alarm input terminal 108. In another example, the control circuit 100 may receive the output signal, and the control circuit 100 may extract the state signal and the alarm signal from the output signal.

If a plurality of the power conversion circuits 200 are connected to a common terminal of the control circuit 100, each of the power conversion circuits 200 may be assigned an identification code. The control circuit 100 may send, when starting communication with any of the power conversion circuits 200, a signal including the identification code of the power conversion circuit 200. When receiving the signal including the identification code corresponding to itself, each of the power conversion circuits 200 may operate according to the signal. The control circuit 100 may determine, based on identification information included in a signal output by the power conversion circuit 200, from which power conversion circuit 200 the signal is output.

The control circuit 100 may notify the start of communication to the power conversion circuit 200 by sending a clock signal. In another example, the control circuit 100 may notify the start of communication by a method similar to I2C communication.

Figure 2:
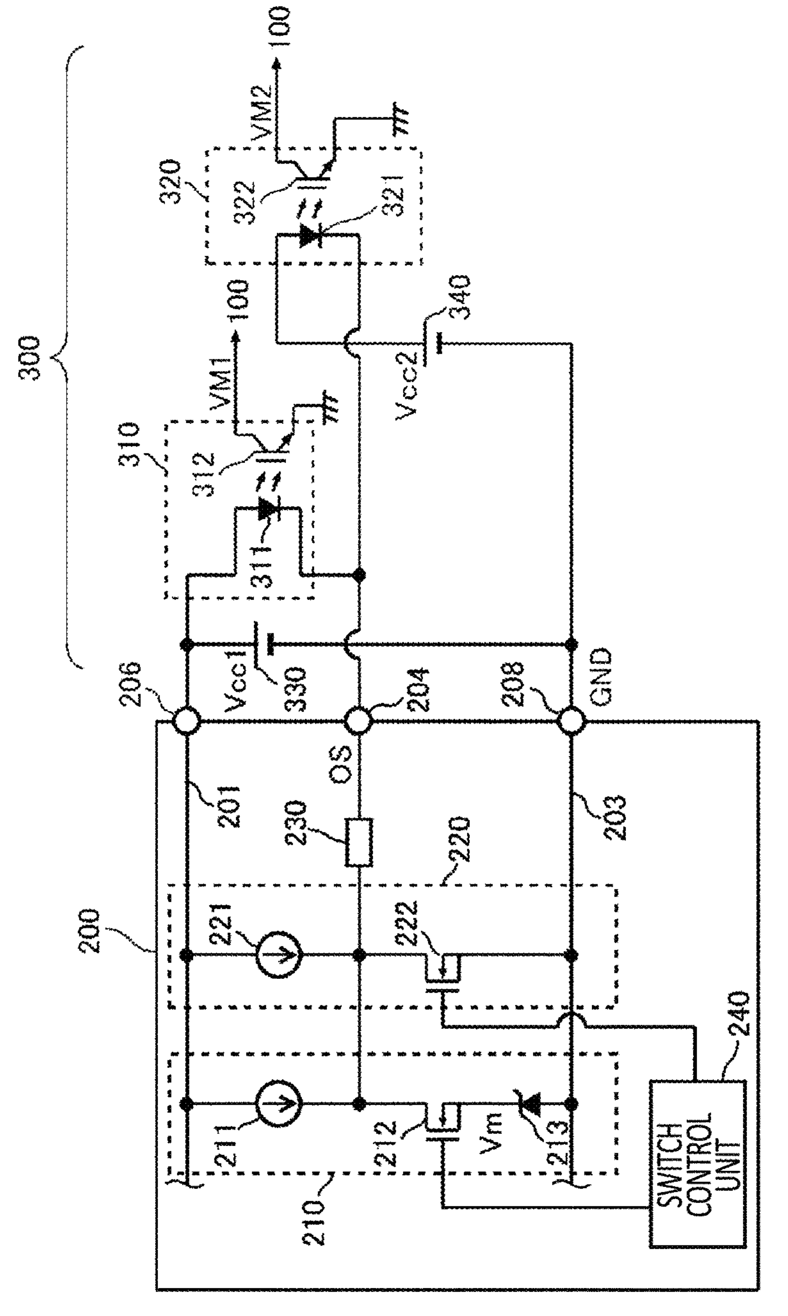
FIG. 2 shows a configuration example of a part of a power conversion circuit 200 and a transmission apparatus 300.

FIG. 2 shows a configuration example of a part of the power conversion circuit 200 and the transmission apparatus 300. In FIG. 2, a configuration of outputting and transmitting an output signal is illustrated, and other configurations are omitted.

The power conversion circuit 200 includes an alarm signal generation unit 220 which generates the alarm signal, and a state signal generation unit 210 which generates the state signal. The state signal generation unit 210 generates the state signal having a pulse of a different amplitude from that of the alarm signal. By making the pulse amplitude of the alarm signal different from the pulse amplitude of the state signal, the pulse of the alarm signal and the pulse of the state signal can be distinguished from each other. The transmission apparatus 300 may determine, based on the amplitude of each pulse included in the output signal, whether each pulse is the pulse of the alarm signal or the pulse of the state signal.

The power conversion circuit 200 of the present example further includes a power supply terminal 206, a power supply wiring 201, a reference voltage terminal 208, and a reference wiring 203. The reference wiring 203 is connected to the reference voltage terminal 208. A reference voltage GND is applied to the reference voltage terminal 208 and the reference wiring 203. The reference voltage GND is, for example, 0 V. The power supply wiring 201 is connected to the power supply terminal 206. A first power supply voltage Vcc 1, which is different from the reference voltage GND, is applied to the power supply terminal 206 and the power supply wiring 201. The first power supply voltage Vcc 1 may be a voltage higher than the reference voltage GND. As an example, the first power supply voltage Vcc 1 is 15 V. The alarm signal generation unit 220 and the state signal generation unit 210 are provided in parallel with each other, between the power supply wiring 201 and the reference wiring 203.

The alarm signal generation unit 220 of the present example switches which of the reference voltage GND and the first power supply voltage Vcc 1 is to be applied to the output terminal 204. For example, the alarm signal generation unit 220 applies the reference voltage GND on the output terminal 204 in a period in which the pulse of the alarm signal should be generated, and applies the first power supply voltage Vcc 1 on the output terminal 204 in other periods.

The alarm signal generation unit 220 of the present example has a second switch 222. The second switch 222 is provided between the power supply wiring 201 and the reference wiring 203, and switches which of the reference voltage GND and the first power supply voltage Vcc 1 is to be applied to the output terminal 204. Once the second switch 222 is turned ON, the reference voltage GND is applied to the output terminal 204, and once the second switch 222 is turned OFF, the first power supply voltage Vcc 1 is applied to the output terminal 204. The second switch 222 is, for example, an MOS transistor. In the present example, a source terminal of the second switch 222 is connected to the reference wiring 203, while a drain terminal is connected to the power supply wiring 201 and the output terminal 204. A second current source 221, which will be described below, may be provided between the drain terminal and the power supply wiring 201. An output resistance 230, which will be described below, may be provided between the drain terminal and the output terminal 204.

The power conversion circuit 200 may include a switch control unit 240 which controls the second switch 222. The switch control unit 240 may generate a gate signal to be applied to a gate terminal of the second switch 222. The switch control unit 240 may turn ON the second switch 222 in a period in which the pulse of the alarm signal should be generated, and turn OFF the second switch 222 in other periods.

The alarm signal generation unit 220 may further have the second current source 221. The second current source 221 is provided between the power supply wiring 201 and the second switch 222. The second current source 221 causes a current to flow in a direction from the power supply wiring 201 toward the second switch 222. A connection point of the second current source 221 and the second switch 222 is connected to the output terminal 204. The output resistance 230 may be provided between the connection point of the second current source 221 and the second switch 222, and the output terminal 204.

The state signal generation unit 210 of the present example switches which of an intermediate voltage Vm closer to the first power supply voltage Vcc 1 than to the reference voltage GND, and the first power supply voltage Vcc 1, is to be applied to the output terminal 204. For example, the state signal generation unit 210 applies the intermediate voltage Vm on the output terminal 204 in a period in which the pulse of the state signal should be generated, and applies the first power supply voltage Vcc 1 on the output terminal 204 in other periods. The intermediate voltage Vm may be greater than half the first power supply voltage Vcc 1. As an example, the intermediate voltage Vm is 10 V.

The state signal generation unit 210 of the present example has a first switch 212 and an intermediate voltage generation unit 213. The first switch 212 is provided between the reference wiring 203 and the power supply wiring 201. The intermediate voltage generation unit 213 is provided between the first switch 212 and the reference wiring 203.

The intermediate voltage generation unit 213 generates the intermediate voltage Vm. The intermediate voltage generation unit 213 of the present example has a Zener diode in which an anode is connected to the reference wiring 203, while a cathode is connected to the first switch 212. The intermediate voltage Vm is generated by breakdown voltage of the Zener diode.

The first switch 212 switches which of the intermediate voltage Vm and the first power supply voltage Vcc 1 is to be applied to the output terminal 204. Once the first switch 212 is turned ON, the intermediate voltage Vm is applied to the output terminal 204, and once the first switch 212 is turned OFF, the first power supply voltage Vcc 1 is applied to the output terminal 204. The first switch 212 is, for example, an MOS transistor. In the present example, a source terminal of the first switch 212 is connected to the intermediate voltage generation unit 213, while a drain terminal is connected to the power supply wiring 201 and the output terminal 204. A first current source 211, which will be described below, may be provided between the drain terminal and the power supply wiring 201. The output resistance 230 may be provided between the drain terminal and the output terminal 204.

The switch control unit 240 may control the first switch 212. The switch control unit 240 may generate a gate signal to be applied to a gate terminal of the first switch 212. The switch control unit 240 may turn ON the first switch 212 in a period in which the pulse of the state signal should be generated, and may turn OFF the first switch 212 in other periods.

The state signal generation unit 210 may further have the first current source 211. The first current source 211 is provided between the power supply wiring 201 and the first switch 212. The first current source 211 causes a current to flow in a direction from the power supply wiring 201 toward the first switch 212. A connection point of the first current source 211 and the first switch 212 is connected to the output terminal 204. The output resistance 230 may be provided between the connection point of the first current source 211 and the first switch 212, and the output terminal 204. The output resistance 230 of the present example is commonly provided for the alarm signal generation unit 220 and the state signal generation unit 210.

An output signal OS in which the alarm signal and the state signal are superimposed is applied to the output terminal 204 of the present example. The pulse of the alarm signal and the pulse of the state signal are included in the output signal OS. The pulse of the alarm signal has a different amplitude from the pulse of the state signal. In a period in which the pulse of the alarm signal overlaps with the pulse of the state signal, a pulse having a greater amplitude (the pulse of the alarm signal in the present example) is arranged in the output signal OS.

The transmission apparatus 300 of the present example has a first transmission unit 310 and a second transmission unit 320. Both the first transmission unit 310 and the second transmission unit 320 are connected to the output terminal 204, and receive the output signal OS.

The first transmission unit 310 of the present example generates a signal VM1 obtained by extracting, among the output signal OS, a component of an amplitude greater than a first reference value (the component of the present example is a pulse). The second transmission unit 320 of the present example generates a signal VM2 obtained by extracting, among the output signal OS, a component of an amplitude greater than a second reference value. In the present example, the first reference value in the first transmission unit 310 is smaller than the second reference value in the second transmission unit 320.

A pulse amplitude of either of the pulse of the state signal and the pulse of the alarm signal is greater than the first reference value and smaller than the second reference value. This pulse is extracted in the first transmission unit 310, but is not extracted in the second transmission unit 320. A pulse amplitude of the another of the pulse of the state signal and the pulse of the alarm signal is greater than the second reference value. This pulse is extracted in both the first transmission unit 310 and the second transmission unit 320.

In the example of FIG. 2, the amplitude of the pulse of the state signal is greater than the first reference value and smaller than the second reference value. In addition, the amplitude of the pulse of the alarm signal is greater than the second reference value. In this case, the signal VM1 generated by the first transmission unit 310 includes both the pulse of the state signal and the pulse of the alarm signal. The signal VM2 generated by the second transmission unit 320 does not include the pulse of the state signal, while including the pulse of the alarm signal.

The second transmission unit 320 in the example of FIG. 2 inputs the signal VM2 to the alarm input terminal 108 of the control circuit 100. When detecting that the pulse of the alarm signal is included in the signal VM2, the control circuit 100 may input, to the power conversion circuit 200, a stop signal for stopping a power conversion operation of the power conversion circuit 200. If the power conversion circuit 200 is performing power conversion by using a switching element, the control circuit 100 may stop a switching operation of the switching element.

When the stop signal is input, the power conversion circuit 200 may further stop outputting the state signal. In another example, the power conversion circuit 200 may continue outputting the state signal even after the stop signal is input. In this manner, the control circuit 100 can detect the temperature, voltage, or current of the power conversion circuit 200 even after the power conversion operation of the power conversion circuit 200 is stopped. If the power conversion operation of the power conversion circuit 200 is stopped based on the alarm signal indicating an overheat state of the power conversion circuit 200, the control circuit 100 may restart the power conversion operation of the power conversion circuit 200 when the temperature of the power conversion circuit 200 becomes a setting value or smaller. If the power conversion operation of the power conversion circuit 200 is stopped based on the alarm signal indicating an overvoltage or overcurrent state of the power conversion circuit 200, the control circuit 100 may restart the power conversion operation of the power conversion circuit 200 when the voltage or current of the power conversion circuit 200 becomes a setting value or smaller.

The first transmission unit 310 of the example in FIG. 2 inputs the signal VM1 to the state signal input terminal 106 of the control circuit 100. The control circuit 100 detects the state signal of the power conversion circuit 200 based on the pulse of the signal VM1. In the present example, the pulse of the signal VM1 in a period in which a pulse exists in the signal VM2 is not the pulse of the state signal. The control circuit 100 may not use the pulse of the signal VM1 in the period in which the pulse exists in the signal VM2, for detection of the state signal.

According to the present example, the alarm signal and the state signal can be output from the output terminal 204 which is in common. In addition, the alarm signal and the state signal can be extracted in the transmission apparatus 300. In a period in which the pulses of the alarm signal and the state signal overlap with each other, the pulse of the alarm signal can be preferentially detected. In this manner, identification of the pulse of the alarm signal and the pulse of the state signal can be performed at a high speed, and abnormality in the power conversion circuit 200 can be sensed at a high speed.

The first transmission unit 310 of the present example has a photocoupler. The first transmission unit 310 has a first light emitting element 311 such as a light-emitting diode, and a first light receiving element 312 such as a phototransistor. The second transmission unit 320 of the present example has a photocoupler. The second transmission unit 320 has a second light emitting element 321 such as a light-emitting diode, and a second light receiving element 322 such as a phototransistor.

The transmission apparatus 300 of the present example further has a first power supply voltage generation unit 330 which generates the first power supply voltage Vcc 1 with reference to the reference voltage GND, and a second power supply voltage generation unit 340 which generates a second power supply voltage Vcc 2 with reference to the reference voltage GND. The second power supply voltage generation unit 340 of the present example is a power supply which generates the second power supply voltage Vcc 2 higher than the reference voltage.

The first power supply voltage Vcc 1 is applied to an anode of the first light emitting element 311, while the output signal OS is applied to a cathode. The first light emitting element 311 emits light once voltage between the anode and the cathode becomes a reference value or higher. The first light receiving element 312 becomes an ON state according to the light emission of the first light emitting element 311, and sets the voltage of the signal VM1 to an L level (for example, 0 V). When the first light receiving element 312 is in an OFF state, the voltage of the signal VM1 becomes a predetermined H level higher than 0 V.

The second power supply voltage Vcc 2 is applied to an anode of the second light emitting element 321, while the output signal OS is applied to a cathode. The second light emitting element 321 emits light once voltage between the anode and the cathode becomes a reference value or higher. The second light receiving element 322 becomes an ON state according to the light emission of the second light emitting element 321, and sets the voltage of the signal VM2 to an L level (for example, 0 V). When the second light receiving element 322 is in an OFF state, the voltage of the signal VM2 becomes a predetermined H level higher than 0 V.

Figure 3:
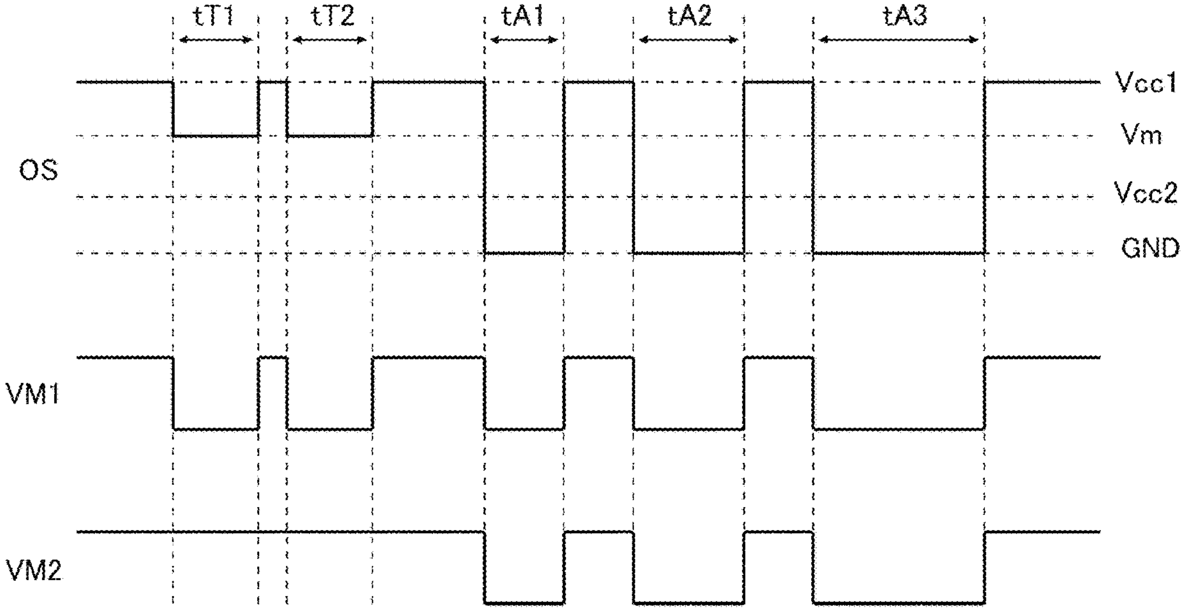
FIG. 3 is a timing chart showing examples of an output signal OS, a signal VM1, and a signal VM2.

FIG. 3 is a timing chart showing examples of the output signal OS, the signal VM1, and the signal VM2. The output signal OS of the present example includes the pulse of the state signal and the pulse of the alarm signal. The pulse of the state signal has an amplitude from the first power supply voltage Vcc 1 to the intermediate voltage Vm. The pulse of the alarm signal has an amplitude from the first power supply voltage Vcc 1 to the reference voltage GND. The second power supply voltage Vcc 2 is a voltage between the reference voltage GND and the intermediate voltage Vm. As an example, the first power supply voltage Vcc 1 is 15 V, the intermediate voltage Vm is 10 V, the second power supply voltage Vcc 2 is 5 V, and the reference voltage GND is 0 V.

The first transmission unit 310 illustrated in FIG. 2 outputs the signal VM1 according to a difference between the first power supply voltage Vcc 1 and the voltage of the output signal OS. When this difference voltage is greater than a first threshold voltage which allows light emission of the first light emitting element 311, a pulse is arranged in the signal VM1. The first threshold voltage of the present example is smaller than a difference between the first power supply voltage Vcc 1 and the intermediate voltage Vm. In addition, the first threshold voltage is smaller than a difference between the first power supply voltage Vcc 1 and the reference voltage GND. In this manner, the pulse is arranged in the signal VM1 in correspondence with both the pulse of the state signal and the pulse of the alarm signal. The control circuit 100 can detect the state signal based on the signal VM1.

The second transmission unit 320 illustrated in FIG. 2 outputs the signal VM2 according to a difference between the second power supply voltage Vcc 2 and the voltage of the output signal OS. When this difference voltage is greater than a second threshold voltage which allows light emission of the second light emitting element 321, a pulse is arranged in the signal VM2. The second threshold voltage of the present example is smaller than a difference between the second power supply voltage Vcc 2 and the reference voltage GND. In this manner, the pulse is arranged in the signal VM2 in correspondence with the pulse of the alarm signal. In addition, the intermediate voltage Vm of an L level in the pulse of the state signal is higher than the second power supply voltage Vcc 2. In this case, reverse voltage is applied to the second light emitting element 321, and light is not emitted. Thus, a pulse corresponding to the pulse of the state signal is not arranged in the signal VM2. The control circuit 100 can detect the alarm signal based on the signal VM2.

Pulse widths tT1, tT2 of the state signal may indicate a numerical value of a temperature, voltage, or current of the power conversion circuit 200. For example, as the pulse width becomes larger, a higher temperature, voltage, or current is indicated. In addition, each pulse width tA1, tA2, tA3 of the alarm signal corresponds to one of abnormal states occurring in the power conversion circuit 200. When a plurality of types of abnormalities occur in the power conversion circuit 200, as illustrated in FIG. 3, the power conversion circuit 200 may generate an output signal having a plurality of pulses corresponding to a plurality of abnormal states.

Figure 4:
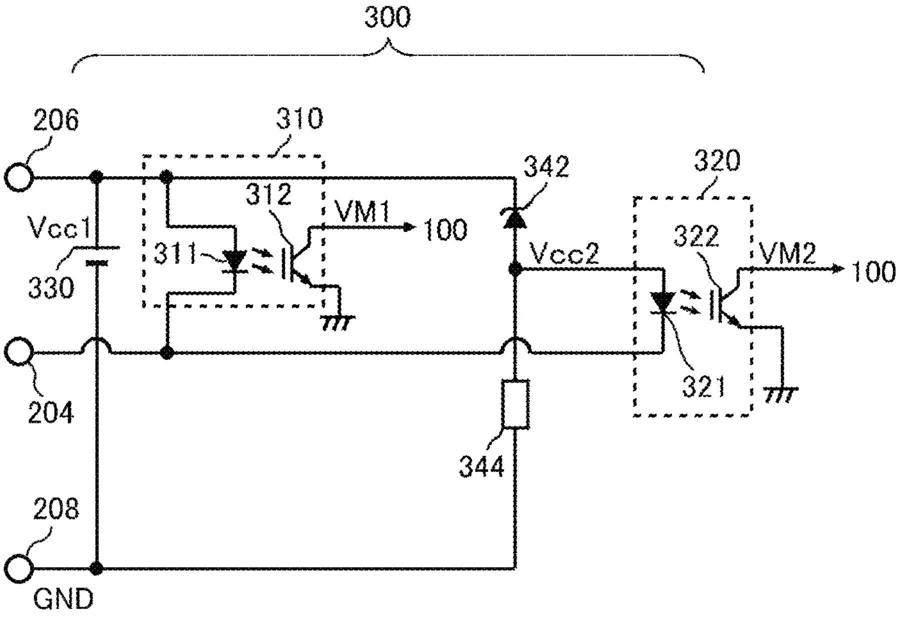
FIG. 4 shows another configuration example of the transmission apparatus 300.

FIG. 4 shows another configuration example of the transmission apparatus 300. The transmission apparatus 300 of the present example includes a step-down circuit 342 functioning as the second power supply voltage generation unit 340. Other configurations are the same as the example illustrated in FIG. 2.

The step-down circuit 342 generates, with reference to the first power supply voltage Vcc 1, the second power supply voltage Vcc 2 obtained by stepping down the first power supply voltage Vcc 1. The step-down circuit 342 may have a Zener diode in which a cathode is connected to the power supply terminal 206, while an anode is connected to the reference voltage terminal 208. The anode of the Zener diode is connected to the anode of the second light emitting element 321. With the breakdown voltage of the Zener diode, the second power supply voltage Vcc 2 which is stepped down than the first power supply voltage Vcc 1 is generated.

As described in FIG. 3, the second power supply voltage Vcc 2 is a voltage between the intermediate voltage Vm and the reference voltage GND. That is, a voltage (Vcc 1−Vcc 2) which is stepped down by the step-down circuit 342 is greater than a difference (Vcc 1−Vm) between the first power supply voltage Vcc 1 and the intermediate voltage Vm.

The transmission apparatus 300 may further include a resistance 344. The resistance 344 is arranged between a connection point of the step-down circuit 342 and the second light emitting element 321, and the reference voltage terminal 208. Also with the present example, as in the case of the examples of FIG. 1 to FIG. 3, the pulse of the alarm signal and the pulse of the state signal can be identified at a high speed. The step-down circuit 342 may be a circuit other than the Zener diode. For example, a regulator circuit can also be used as the step-down circuit 342.

Figure 5:
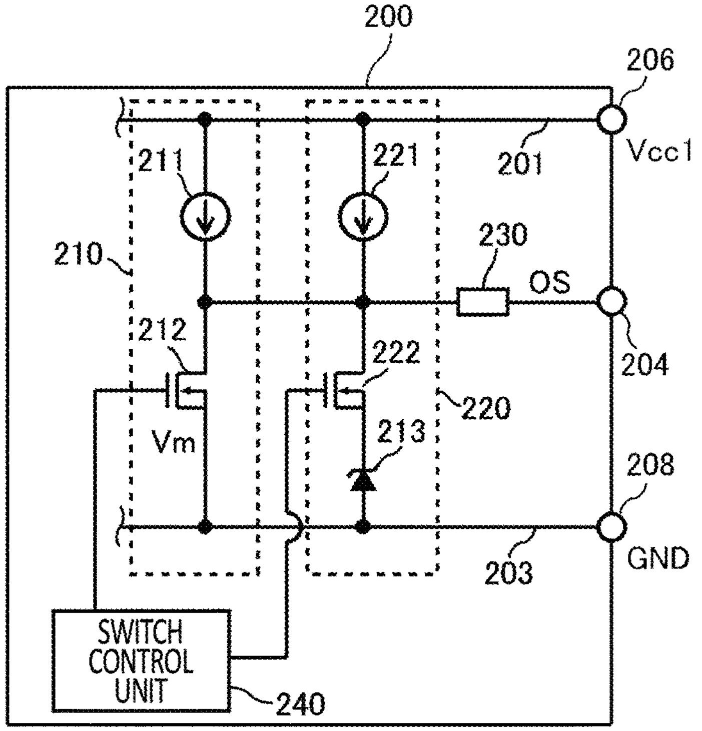
FIG. 5 shows another configuration example of the power conversion circuit 200.

FIG. 5 shows another configuration example of the power conversion circuit 200. In the present example, the intermediate voltage generation unit 213 is provided for the alarm signal generation unit 220, and not for the state signal generation unit 210. Other configurations are the same as the example illustrated in FIG. 2. The intermediate voltage generation unit 213 of the present example is provided between the second switch 222 and the reference wiring 203. In the present example, the anode of the intermediate voltage generation unit 213 is connected to the reference wiring 203, while the cathode is connected to the source of the second switch 222.

In the present example, an amplitude of the pulse of the alarm signal is smaller than an amplitude of the pulse of the state signal. Also in the present example, the first transmission unit 310 generates the signal VM1 obtained by extracting, among the output signal OS, a component (in the present example, a pulse) of an amplitude greater than the first reference value. The second transmission unit 320 generates the signal VM2 obtained by extracting, among the output signal OS, a component of an amplitude greater than the second reference value. The first reference value in the first transmission unit 310 is smaller than the second reference value in the second transmission unit 320.

In the present example, the amplitude of the pulse of the alarm signal is greater than the first reference value and smaller than the second reference value. In addition, the amplitude of the pulse of the state signal is greater than the second reference value. In this case, the signal VM2 generated by the second transmission unit 320 includes both the pulse of the state signal and the pulse of the alarm signal. The signal VM1 generated by the first transmission unit 310 includes the pulse of the state signal, while not including the pulse of the alarm signal.

Figure 6:
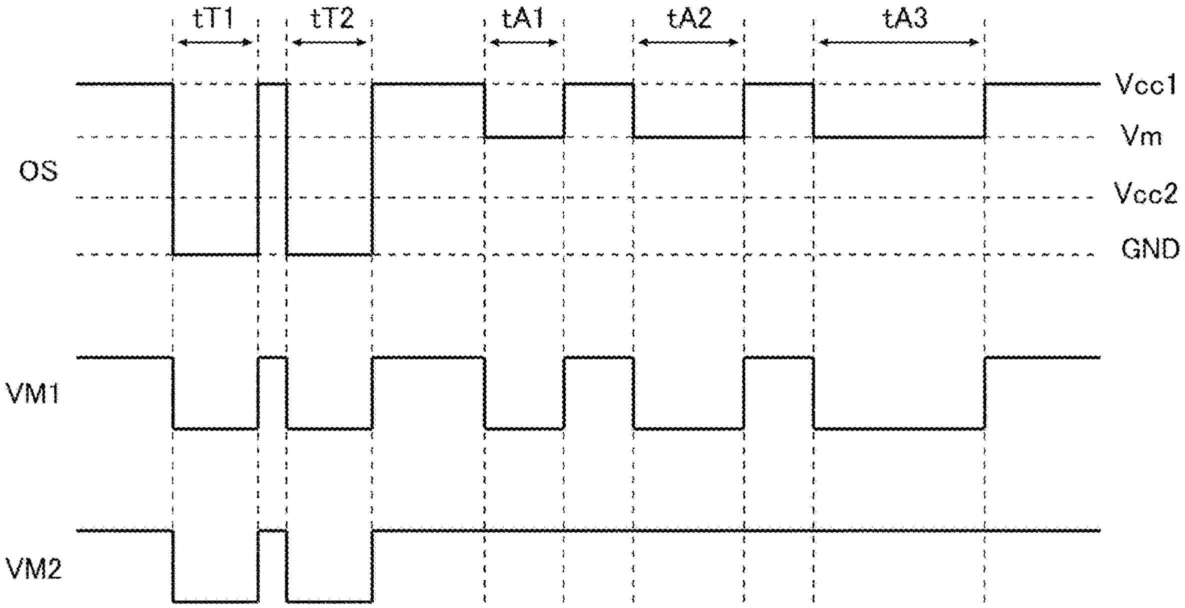
FIG. 6 is a timing chart showing examples of the output signal OS, the signal VM1, and the signal VM2, in the configuration illustrated in FIG. 5.

FIG. 6 is a timing chart showing examples of the output signal OS, the signal VM1, and the signal VM2, in the configuration illustrated in FIG. 5. The pulse of the state signal in the present example has an amplitude from the first power supply voltage Vcc 1 to the reference voltage GND. The pulse of the alarm signal has an amplitude from the first power supply voltage Vcc 1 to the intermediate voltage Vm.

In the present example, a pulse is arranged in the signal VM1 in correspondence with both the pulse of the state signal and the pulse of the alarm signal. In addition, a pulse is arranged in the signal VM2 in correspondence with the pulse of the state signal.

The control circuit 100 can detect the state of the power conversion circuit 200 based on the pulse widths tT1, tT2 of the signal VM2. The control circuit 100 detects the alarm signal of the power conversion circuit 200 based on the pulse of the signal VM1. In the present example, the pulse of the signal VM1 in a period in which a pulse exists in the signal VM2 is not the pulse of the alarm signal. The control circuit 100 may not use the pulse of the signal VM1 in the period in which the pulse exists in the signal VM2, for detection of the alarm signal.

According to the present example, the alarm signal and the state signal can be output from the output terminal 204 which is in common. In addition, the alarm signal and the state signal can be extracted in the transmission apparatus 300. In a period in which the pulses of the alarm signal and the state signal overlap with each other, the pulse of the state signal can be preferentially detected. In this manner, sensing of the temperature, voltage, or current of the power conversion circuit 200 is facilitated.

Figure 7:
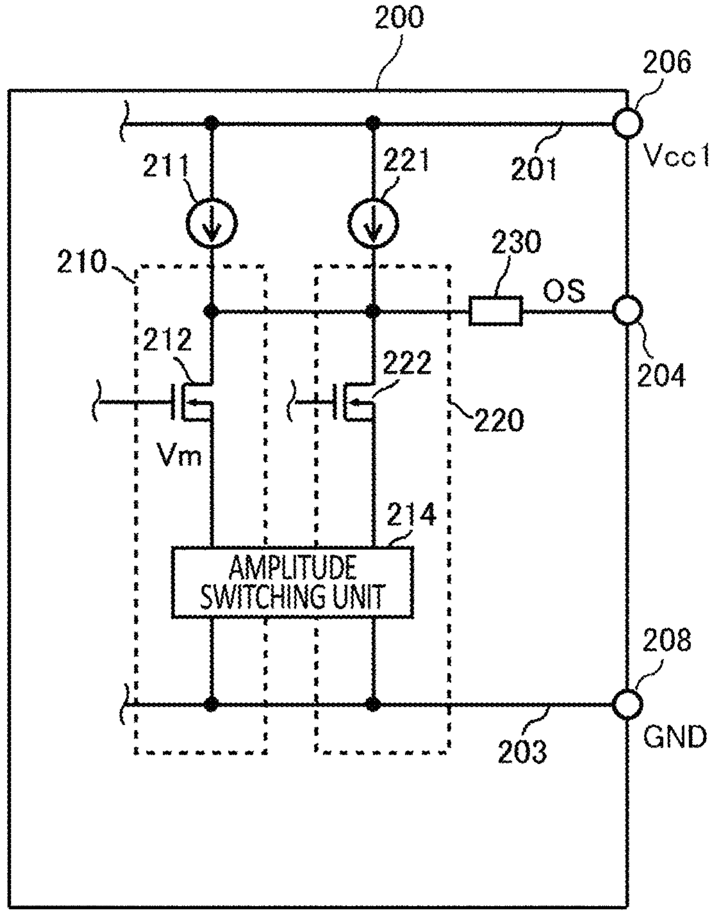
FIG. 7 shows another configuration example of the power conversion circuit 200.

FIG. 7 shows another configuration example of the power conversion circuit 200. The power conversion circuit 200 of the present example further includes an amplitude switching unit 214 for the configuration illustrated in FIG. 2 or FIG. 5. The intermediate voltage generation unit 213 may be provided inside the amplitude switching unit 214. In addition, in FIG. 7, the switch control unit 240 is omitted. Other configurations are the same as the example of FIG. 2 or FIG. 5.

The amplitude switching unit 214 switches as which of the example described in FIG. 2 and the example described in FIG. 5 the power conversion circuit 200 is caused to function. That is, the amplitude switching unit 214 switches, out of the alarm signal and the state signal, an amplitude of which signal is made greater than another. The amplitude switching unit 214 may switch, out of the alarm signal and the state signal, an amplitude of which signal is made greater than the second reference value, and an amplitude of which signal is made greater than the first reference value and smaller than the second reference value.

The amplitude switching unit 214 may switch whether to connect the intermediate voltage generation unit 213 to the alarm signal generation unit 220 as illustrated in FIG. 5, or to the state signal generation unit 210 as illustrated in FIG. 2. The amplitude switching unit 214 may have a switching switch that switches whether to connect the intermediate voltage generation unit 213 to the alarm signal generation unit 220 or to the state signal generation unit 210.

The amplitude switching unit 214 may have a first path having the intermediate voltage generation unit 213 and a second path not having the intermediate voltage generation unit 213. The switching switch may select either of the first switch 212 and the second switch 222 for connection to the reference wiring 203 via the first path, and may select either of the first switch 212 and the second switch 222 for connection to the reference wiring 203 via the second path.

According to the present example, the power conversion circuit 200 can be caused to function as either the example of FIG. 2 or the example of FIG. 5. As which of the examples the power conversion circuit 200 is caused to function may be set by a user of the power conversion circuit 200 or a manufacturer of the power conversion circuit 200, or may be controlled by the control circuit 100 or another apparatus. Information on as which of the examples the power conversion circuit 200 is caused to function may be notified to the control circuit 100. The amplitude switching unit 214 may notify the information to the control circuit 100.

The control circuit 100 may determine, based on as which of the examples the power conversion circuit 200 is caused to function, whether the pulse of the signal VM2 is the pulse of the alarm signal or the pulse of the state signal. The control circuit 100 may determine, based on as which of the examples the power conversion circuit 200 is caused to function, whether the pulse of the signal VM1 not overlapping with the pulse of the signal VM2 is the pulse of the alarm signal or the pulse of the state signal.

While the present invention has been described with the embodiments, the technical scope of the present invention is not limited to the above embodiments. It is apparent to persons skilled in the art that various alterations or improvements can be added to the above-described embodiments. It is also apparent from description of the claims that the embodiments to which such alterations or improvements are made can be included in the technical scope of the present invention.

What is claimed is:

1. A circuit apparatus comprising a power conversion circuit and a transmission apparatus, the transmission apparatus transmitting a signal from the power conversion circuit, wherein the power conversion circuit has:

an alarm signal generation unit which generates an alarm signal indicating whether the power conversion circuit is in a preset state; and a state signal generation unit which generates a state signal having an amplitude different from that of the alarm signal and indicating a state of the power conversion circuit, wherein the power conversion circuit further has an output terminal which outputs an output signal in which the alarm signal and the state signal are superimposed, wherein the alarm signal generation unit switches which of a reference voltage and a first power supply voltage different from the reference voltage is to be applied to the output terminal, and wherein the state signal generation unit switches which of an intermediate voltage closer to the first power supply voltage than to the reference voltage, and the first power supply voltage is to be applied to the output terminal.

2. The circuit apparatus according to claim 1, wherein the power conversion circuit further has:

a reference wiring to which the reference voltage is applied; and a power supply wiring to which the first power supply voltage is applied, and the state signal generation unit has:

a first switch provided between the reference wiring and the power supply wiring; and an intermediate voltage generation unit which is provided between the first switch and the reference wiring and generates the intermediate voltage.

3. The circuit apparatus according to claim 2, wherein the alarm signal generation unit has a second switch that switches which of the reference voltage and the first power supply voltage is to be applied to the output terminal.

4. The circuit apparatus according to claim 1, wherein the transmission apparatus has:

a first transmission unit which transmits, among the output signal, a component of an amplitude greater than a first reference value; and a second transmission unit which transmits, among the output signal, a component of an amplitude greater than a second reference value, and the first reference value is smaller than the second reference value.

5. The circuit apparatus according to claim 4, wherein an amplitude of the state signal is greater than the first reference value and smaller than the second reference value, and an amplitude of the alarm signal is greater than the second reference value.

6. The circuit apparatus according to claim 4, wherein an amplitude of the state signal is greater than the second reference value, and an amplitude of the alarm signal is greater than the first reference value and smaller than the second reference value.

7. The circuit apparatus according to claim 4, wherein the power conversion circuit further has an amplitude switching unit which switches, out of the alarm signal and the state signal, an amplitude of which signal is made greater than the second reference value, and an amplitude of which signal is made greater than the first reference value and smaller than the second reference value.

8. The circuit apparatus according to claim 1, wherein the transmission apparatus has:

a second power supply voltage generation unit which generates a second power supply voltage between the reference voltage and the intermediate voltage;

a first transmission unit which outputs a signal according to a difference between the first power supply voltage and a voltage of the output terminal; and a second transmission unit which outputs a signal according to a difference between the second power supply voltage and the voltage of the output terminal.

9. The circuit apparatus according to claim 8, wherein the second power supply voltage generation unit is a power supply which generates, with reference to the reference voltage, the second power supply voltage higher than the reference voltage.

10. The circuit apparatus according to claim 8, wherein the second power supply voltage generation unit is a step-down circuit which generates, with reference to the first power supply voltage, the second power supply voltage obtained by stepping down the first power supply voltage.

11. The circuit apparatus according to claim 1, wherein a stop signal for stopping a power conversion operation is input to the power conversion circuit, and the power conversion circuit continues outputting the state signal even after the stop signal is input.

12. The circuit apparatus according to claim 1, wherein the state signal is a signal indicating any state among a temperature, a current, and a voltage of the power conversion circuit, and the state signal generation unit generates the state signal.

13. A power conversion circuit, comprising:

an alarm signal generation unit which generates an alarm signal indicating whether the power conversion circuit is in a preset state;

a state signal generation unit which generates a state signal having an amplitude different from that of the alarm signal and indicating a state of the power conversion circuit; and an output terminal which outputs an output signal in which the alarm signal and the state signal are superimposed, wherein the alarm signal generation unit switches which of a reference voltage and a first power supply voltage different from the reference voltage is to be applied to the output terminal, and the state signal generation unit switches which of an intermediate voltage closer to the first power supply voltage than to the reference voltage, and the first power supply voltage is to be applied to the output terminal.

14. The power conversion circuit according to claim 13, further comprising:

a reference wiring to which the reference voltage is applied; and a power supply wiring to which the first power supply voltage is applied, wherein the state signal generation unit has:

a first switch provided between the reference wiring and the power supply wiring; and an intermediate voltage generation unit which is provided between the first switch and the reference wiring and generates the intermediate voltage.

15. The power conversion circuit according to claim 14, wherein the alarm signal generation unit has a second switch that switches which of the reference voltage and the first power supply voltage is to be applied to the output terminal.

16. The power conversion circuit according to claim 13, further comprising:

an amplitude switching unit which switches, out of the alarm signal and the state signal, an amplitude of which signal is made greater than another.

17. The power conversion circuit according to claim 13, wherein the state signal is a signal indicating any state among a temperature, a current, and a voltage of the power conversion circuit, and the state signal generation unit generates the state signal.

* * * * *